Sept. 3, 1929.  F. J. ANDEL  1,726,531
AUTOMOBILE HEATER
Filed Sept. 29, 1927   2 Sheets-Sheet 1
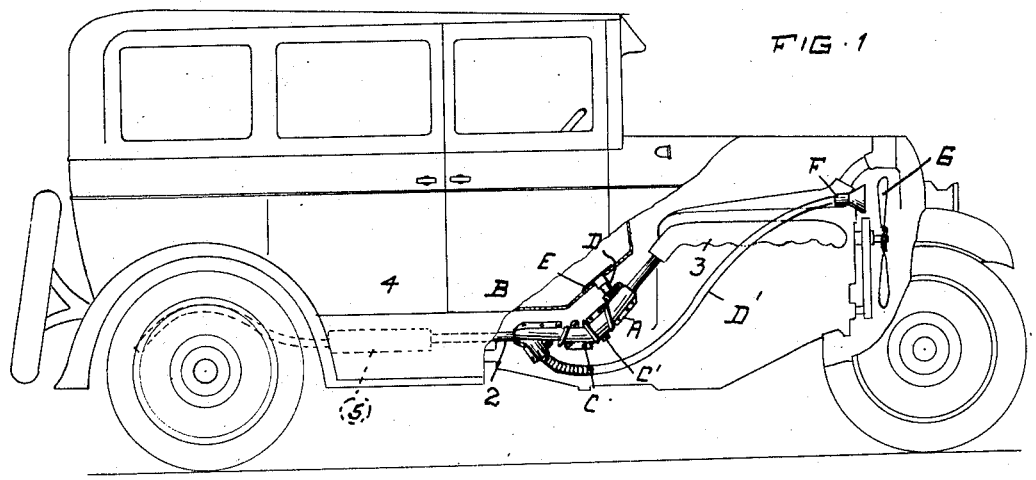
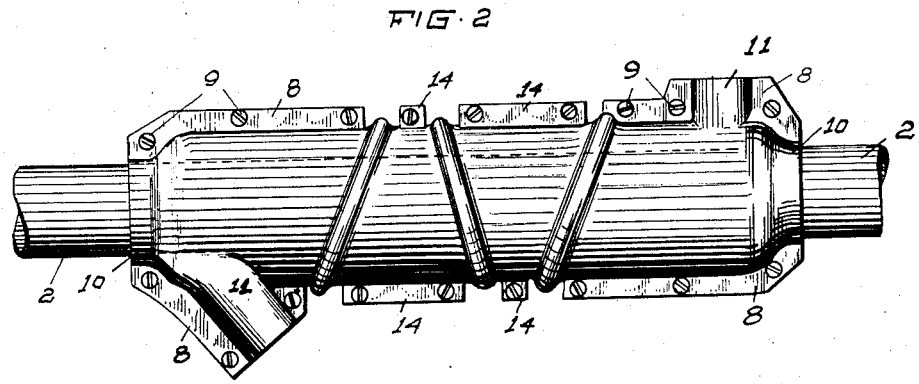
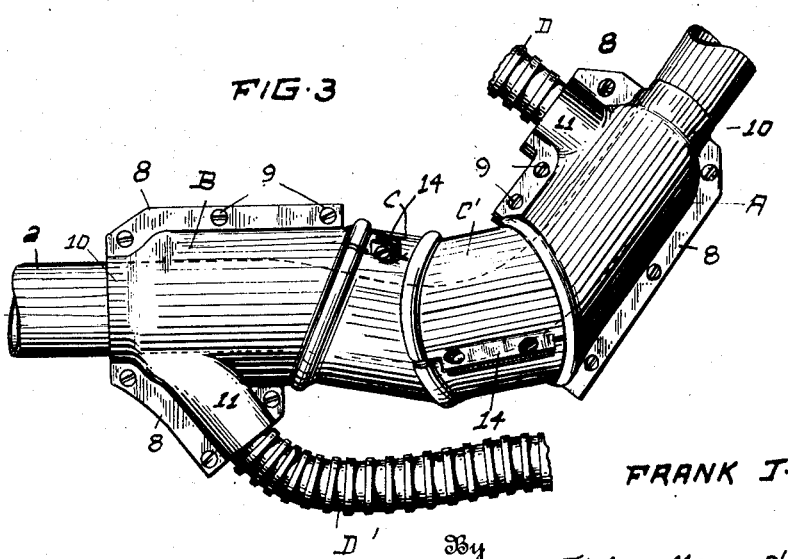
Inventor
FRANK J. ANDEL
By Fisher, Moser & Moore
Attorney Sept. 3, 1929.　　　F. J. ANDEL　　　1,726,531
AUTOMOBILE HEATER
Filed Sept. 29, 1927　　2 Sheets-Sheet 2
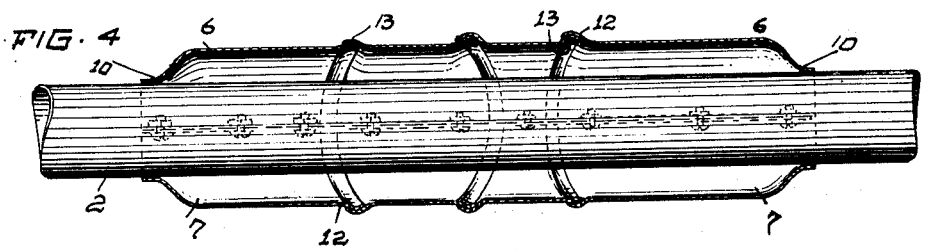
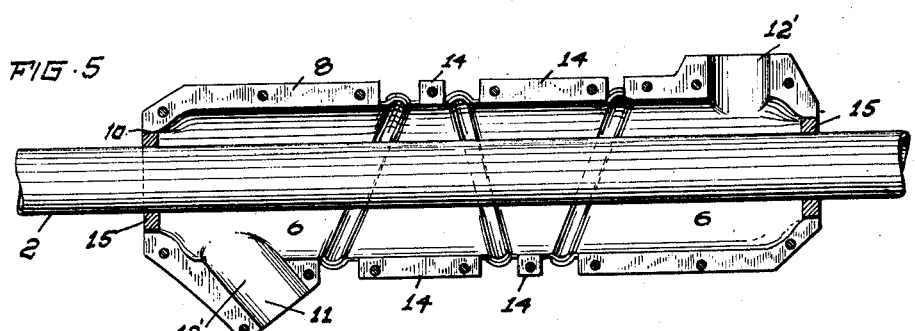
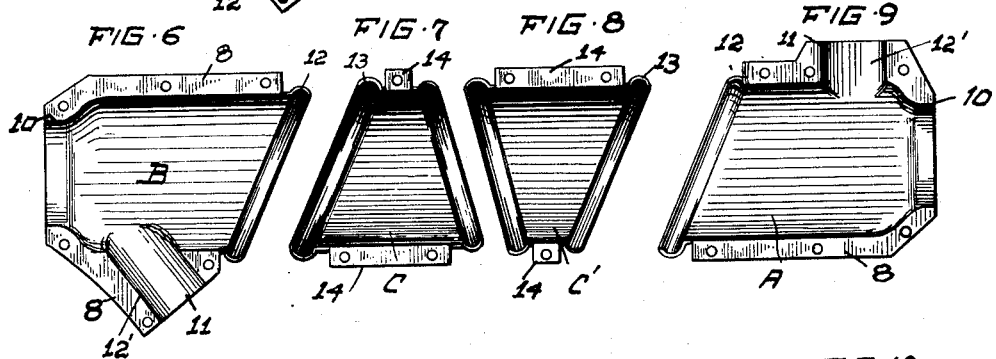
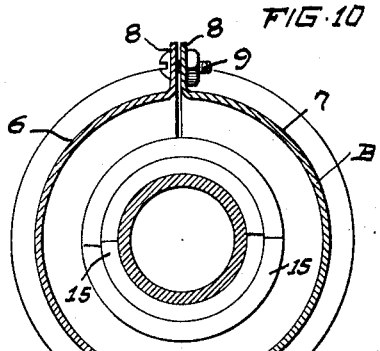
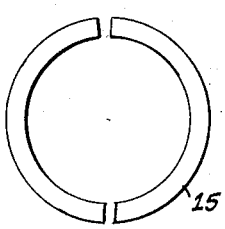
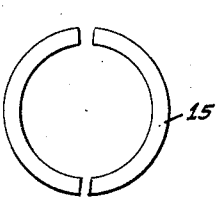
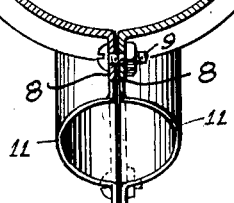
Inventor
FRANK J. ANDEL
By Fisher, Moser & Moore.
Attorney Patented Sept. 3, 1929.

1,726,531

UNITED STATES PATENT OFFICE.

FRANK J. ANDEL, OF CLEVELAND, OHIO.

AUTOMOBILE HEATER.

Application filed September 29, 1927. Serial No. 222,744.

My invention relates to an improvement in automobile heaters, and the object of the invention in brief is to provide a sectional hot air heater which may be readily sleeved over and attached to the exhaust pipe of an engine regardless of whether the pipe is straight, bent at an angle, or of irregular curvature. The automobiles in general use comprise internal combustion engines having exhaust pipes which extend beneath the vehicle body, and the pipes are bent variously according to the needs of given installations. Thus in some instances, the pipe is straight, in other a simple bend is present, while in still other cases the pipes are not only bent but also irregular or of compound curvature. The angle of inclination of the bent parts of the pipe also differ in many of such installations. Consequently, I have devised a tubular heater made of three or more sections, so united together that they may be turned or adjusted to fit any angle, bend or curvature in an exhaust pipe. In effect the united sections form a tubular universal joint which will permit the heater to be sleeved very readily as a whole upon any exhaust pipe as used generally in automobiles of today. Each section of the heater is also made in two parts to permit attachment of the sections singly and successively to each other and to an exhaust pipe as fixedly installed in an automobile. At least three sections are used to form the heater, but four or more are frequently employed and the end sections are particularly constructed to clamp directly upon the exhaust pipe when the two duplicate parts or stampings which form each end section are clamped and united together. Each end section is also constructed to clamp an air tube or conduit between the respective parts or halves thereof when said parts are clamped together and attached to the exhaust pipe.

In the accompanying drawing, Fig. 1 is a side elevation of an automobile showing my improved heater attached to the engine exhaust pipe. Fig. 2 is a side elevation, on a larger scale, of the heater affixed to a straight exhaust pipe, and Fig. 3 is a side view of the same heater affixed to an exhaust pipe of compound curvature. Fig. 4 is a sectional view of the heater on a straight pipe, Fig. 5 a sectional view of the same heater attached to a smaller pipe, the view being taken on the dividing line or parting line between the respective parts or halves where bolted together. Figs. 6, 7, 8, and 9 are separate views of each half piece or portion shown united together in Fig. 5. Fig. 10 is a sectional view of one end section of the heater fastened to a pipe of small diameter and showing a set of ring adapters to fit such a small pipe, and Figs. 11 and 12 are side views of two pairs of segmental ring adapters of different diameters.

The automobiles in general use embody varied types and kinds of internal combustion engines and exhaust pipes, but the exhaust pipe 2 (referring to Fig. 1) usually extends from the manifold 3 at the top of the engine downwardly and rearwardly and thence underneath the body 4 to a muffler 5. The angle of inclination of the bent part of the exhaust varies in different makes of automobiles, and the bend may be a simple curved bend or of compound curvature. The bend may be projected laterally as well as upwardly in some cases, and more than one bend may be present at spaced intervals. The present heater is designed to sleeve over any kind of bend, a plural number of such bends, or on a straight portion of the exhaust pipe. To that end the heater comprises two tubular end sections or members A and B, respectively, and one or more intermediate tubular connecting sections or members C—C'. Each end section is made in two parts or halves 6 and 7, respectively, as if divided on the longitudinal medial line, and the longitudinal border edges of each half part are flanged outwardly, the flanges 8 being perforated to receive bolts or screws 9 to permit the two pieces to be fastened together with clamping effect on pipe 2 at their outer reduced ends 10. A portion 11 of the flange 8 in each section is extended outwardly a substantial distance and stamped partly flat and partly circular to provide a channeled wall 12' which merges with the round main body of the piece, and when the two pieces or halves 6 and 7 are placed together, the respective channeled portions 11 provide a round opening within which one end of a tube or conduit D may be securely held, merely by bolting the two halves 6 and 7 together. Section A is preferably constructed with channeled portions 11 extending at right angles to the main body of the section, whereas section B is preferably made with its channeled portion 11 extending at an acute angle to the axis, thereby permitting section A to be conveniently connected by a short tube or conduit D to a heater box or register E set within the floor or foot board of the automobile, and section B to conveniently clamp and hold one end of a longer tube or conduit D' without abrupt bends therein and so that it may extend forwardly into the front end of the hood where a funneled shaped intake F is fixed to the engine adjacent the fan G.

End sections A and B are further distinguished in that one cylindrical end of each is cut in a plane lying at an obtuse angle to the axis of the cylinder, and the circular edge of this angularly-related end opening is beaded, that is, formed with a channeled bead 12 adapted to overlap or be nested within a similar beaded edge 13 on a supplemental intermediate connecting section C or C'. A rotatable joint is thereby provided between two such sections which permits one section to be set either axially coincident with the other attached section or projected at an angle in respect thereto. Preferably two intermediate sections C—C' are used, which are counterparts. Thus these sections are each made in two halves or parts having bolting flanges 14 to permit them to be affixed to exhaust pipe 2 and to each other and the end sections, and each intermediate section C—C' is relatively short having its opposite beaded ends disposed in reversely-inclined relation at the same angle of inclination to the axis as described. Consequently when the two middle sections C—C' are connected together they may be turned in respect to each and set at different angles, or aligned on a straight line, if desired. When all four sections A, C, C', and B, are connected they may be twisted or rotated into many shapes to fit any kind of a bend in an exhaust pipe, for example, as shown in Fig. 3.

The heater may be made to fit exhaust pipes of any given diameter, but I may use spit ring-shaped adapters or bushings 15, see Figs. 10 to 12, in affixing the heater to pipes of smaller diameter than the ones for which they are purposely designed.

In operation, air is taken in or forced into the intake funnel G and passes through the flexible tube or conduit D' to the rear end or section B of the heater. The air is then heated by the exhaust pipe as it passes through the successive heater sections and before it is permitted to escape at the front end or section A, the tube or conduit D delivering the hot air to a register or distributer box of any suitable construction in the floor or walls of the vehicle. The respective halves of each section are exact duplicates made by stamping and drawing operations, and by making each section in two halves the heater may be installed very quickly and conveniently on any exhaust pipe without disconnecting or dismantling the pipe.

What I claim, is:

An automobile heater, comprising separate cylindrical end sections, each being made of two counterpart pieces having channeled flanges to receive a conduit, and reduced at one end to clamp upon an exhaust pipe and having a beaded edge in an inclined plane at its opposite end, in combination with a plurality of intermediate sections, each made in two counterpart pieces formed with beaded edges lying in reversely-related oblique planes at opposite ends thereof, and means adapted to clamp the counterpart pieces of each section together and in rotatable union at its beaded edge with the beaded edge of another cylindrical section.

In testimony whereof I affix my signature.

FRANK J. ANDEL.